(12) United States Patent
Rees-Jones et al.

(10) Patent No.: US 11,528,978 B2
(45) Date of Patent: Dec. 20, 2022

(54) HAIR CONDITIONING TREATMENT APPARATUS AND METHOD

(71) Applicant: ROHOLM LIMITED, Tauranga (NZ)

(72) Inventors: Blythe Guy Rees-Jones, Papamoa (NZ); David Erl Roe, Tauranga (NZ); Jonathan Martin Jones, Tauranga (NZ); Simon John Crane, Tauranga (NZ); Timothy Mark Allan, Tauranga (NZ)

(73) Assignee: ROHOLM LIMITED, Tauranga (NZ)

( * ) Notice: Subject to any disclaimer, the term of this patent is extended or adjusted under 35 U.S.C. 154(b) by 1592 days.

(21) Appl. No.: 15/318,208

(22) PCT Filed: Jun. 12, 2015

(86) PCT No.: PCT/NZ2015/050074
§ 371 (c)(1),
(2) Date: Dec. 12, 2016

(87) PCT Pub. No.: WO2015/190939
PCT Pub. Date: Dec. 17, 2015

(65) Prior Publication Data
US 2017/0127784 A1    May 11, 2017

(30) Foreign Application Priority Data

Jun. 13, 2014  (NZ) .................................... 626228
Aug. 4, 2014   (NZ) .................................... 628245

(51) Int. Cl.
*A45D 1/06*     (2006.01)
*A45D 7/02*     (2006.01)
(Continued)

(52) U.S. Cl.
CPC ................. *A45D 1/06* (2013.01); *A45D 1/20* (2013.01); *A45D 2/001* (2013.01); *A45D 2/10* (2013.01);
(Continued)

(58) Field of Classification Search
None
See application file for complete search history.

(56) References Cited

U.S. PATENT DOCUMENTS 3,182,667 A     5/1965  Beste
3,900,035 A *   8/1975  Welch ....................... A61F 7/10
                                                          607/108
(Continued)

FOREIGN PATENT DOCUMENTS

AU    2003100806    11/2003
CN    203483024     3/2014
(Continued)

OTHER PUBLICATIONS

Purdue University, Thermodynamic Properties of Some Currently Used Water-Antifreeze Mixtures when used as Ice Slurries, pp. 1-9, 2000 (Year: 2000).*
(Continued)

*Primary Examiner* — Jacqueline T Johanas
*Assistant Examiner* — Sarah Woodhouse
(74) *Attorney, Agent, or Firm* — Clayton, McKay & Bailey, PC

(57) ABSTRACT

In one aspect the invention is arranged to provide a hair treatment apparatus adapted to reduce the temperature of hair. This apparatus includes at least one thermal energy storage core arranged to draw heat out of hair wherein said at least one thermal energy storage core is arranged to cool hair to a temperature below 0° Celsius.

20 Claims, 10 Drawing Sheets

(51) Int. Cl.
- *A45D 6/12* (2006.01)
- *A45D 19/16* (2006.01)
- *A45D 2/00* (2006.01)
- *A45D 2/12* (2006.01)
- *A45D 1/20* (2006.01)
- *A45D 2/40* (2006.01)
- *A45D 6/20* (2006.01)
- *A45D 4/16* (2006.01)
- *A46B 9/02* (2006.01)
- *A45D 2/10* (2006.01)
- *A45D 1/00* (2006.01)
- *A45D 2/24* (2006.01)
- *A45D 2/36* (2006.01)

(52) U.S. Cl.
CPC ................. *A45D 2/12* (2013.01); *A45D 2/40* (2013.01); *A45D 4/16* (2013.01); *A45D 6/12* (2013.01); *A45D 6/20* (2013.01); *A45D 7/02* (2013.01); *A45D 19/16* (2013.01); *A46B 9/023* (2013.01); *A45D 1/00* (2013.01); *A45D 2/2471* (2013.01); *A45D 2/362* (2013.01); *A46B 2200/104* (2013.01)

(56) References Cited

U.S. PATENT DOCUMENTS

| | | | |
|---|---|---|---|
| 4,204,543 A * | 5/1980 | Henderson | A41D 13/0055 607/112 |
| 4,356,709 A | 11/1982 | Alexander | |
| 5,163,425 A * | 11/1992 | Nambu | A42B 1/008 607/110 |
| 5,785,064 A | 7/1998 | Simpson | |
| 7,989,734 B2 * | 8/2011 | Lee | A45D 1/04 132/224 |
| 8,721,642 B1 * | 5/2014 | Sullivan | A61F 7/12 606/60 |
| 2003/0051367 A1 * | 3/2003 | Griffin | F26B 5/005 34/132 |
| 2006/0207625 A1 | 9/2006 | Chan | |
| 2007/0212309 A1 * | 9/2007 | Pruess | A61K 8/02 424/47 |
| 2009/0301511 A1 * | 12/2009 | Vinci | B65D 81/3897 132/316 |
| 2010/0037366 A1 | 2/2010 | Panicali | |
| 2010/0154817 A1 * | 6/2010 | Lee | A45D 1/04 132/224 |
| 2010/0331752 A1 | 12/2010 | Cumming | |
| 2011/0056509 A1 * | 3/2011 | Benest | F25B 21/02 132/223 |
| 2012/0024311 A1 * | 2/2012 | Linglin | A45D 2/002 132/232 |
| 2012/0227758 A1 * | 9/2012 | Ford | A45D 1/04 132/211 |
| 2013/0192625 A1 | 8/2013 | Migliori | |
| 2014/0379058 A1 * | 12/2014 | Farrago | A61F 7/02 607/110 |
| 2015/0047669 A1 * | 2/2015 | Huang | A45D 19/16 132/271 |

FOREIGN PATENT DOCUMENTS

| | | | | |
|---|---|---|---|---|
| GB | 2459507 | | 10/2009 | |
| GB | 2459507 A | * | 10/2009 | |
| GB | 2522647 A | * | 8/2015 | ............ A45D 19/02 |
| JP | 3187825 | | 12/2013 | |
| WO | WO2007000700 | | 6/2010 | |
| WO | WO2013013965 | | 1/2013 | |
| WO | WO2013104903 | | 7/2013 | |
| WO | WO-2013191426 A1 | * | 12/2013 | ............ A45D 24/00 |

OTHER PUBLICATIONS

Freezing Point Depression in Solutions, Hyperphysics.com, 2013 (Year: 2013).*

International Preliminary Report on Patentability for PCT/NZ2015/050074.

* cited by examiner

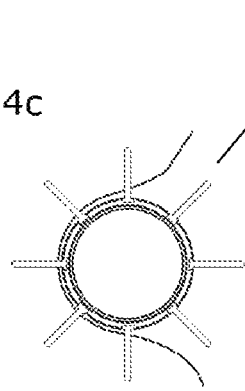
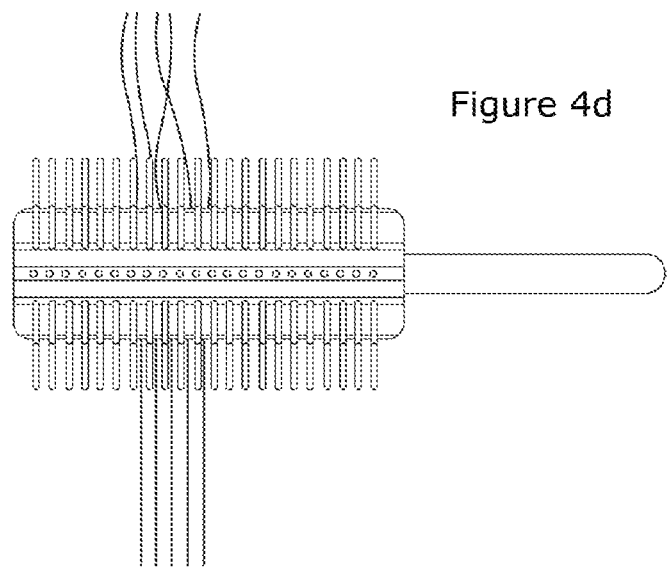
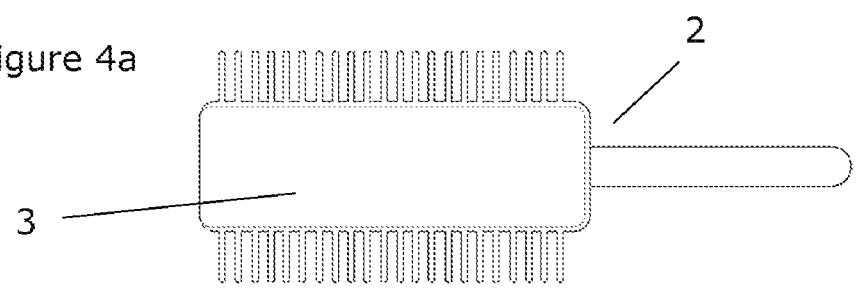
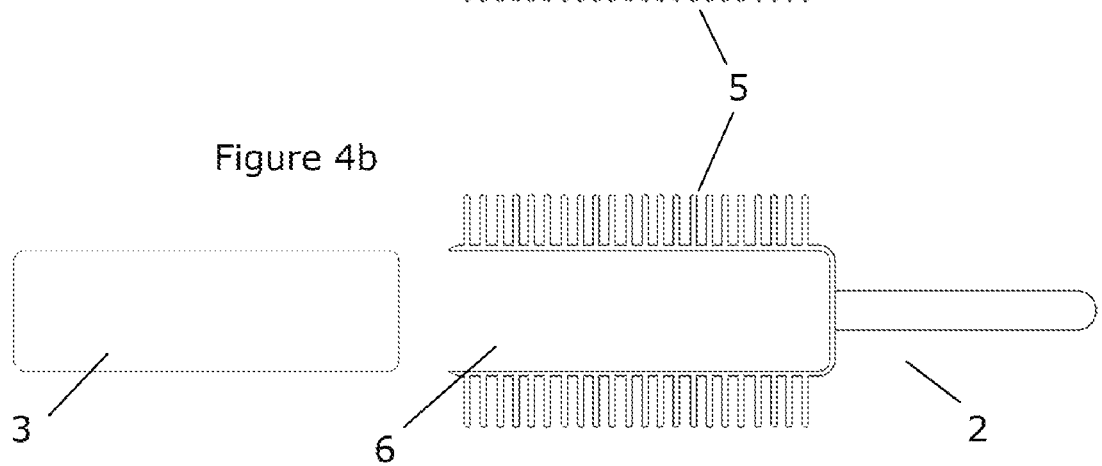

HAIR CONDITIONING TREATMENT APPARATUS AND METHOD

This application is a United States national phase filing of PCT/NZ2015/050074, filed Jun. 12, 2015, which claims priority to NZ 626228, filed Jun. 13, 2014 and NZ 628245, filed Aug. 4, 2014, each of which is hereby incorporated by reference herein in their entireties.

TECHNICAL FIELD

This invention relates to a hair treatment apparatus that facilitates the execution of a low temperature hair conditioning treatment method.

BACKGROUND ART

Hair care, hair maintenance and hairstyling technologies are used by many people to improve their appearance. Various treatments regimes and systems have been developed to provide distinctive and attractive hairstyles and hair qualities.

A variety of known hair treatments and devices involve the direct application of heat to hair fibres in order to 'set' or 'fix' it in a particular style or to straighten hair for a different appearance to naturally curly hair.

However the application of high heat (between 40-250 Degrees Celsius) has been shown to cause superficial and structural damage to the hair being treated in part due to the explosive removal of free water and strongly bound water leading to a 10% loss in tensile strength and an increase in friction resulting in poor manageability and hair health.

A number of hair cooling devices have been developed in an attempt to mitigate or remove these heat damage effects and in some instances to improve the lifespan of the resulting hairstyle. In particular, U.S. Pat. Nos. 7,989,734 and 8,347,879 disclose the provision of Peltier junction based thermoelectric cooler (TEC) devices used with existing types of heat producing hair clamping tong implements.

These devices are arranged to heat hair to high temperatures and then attempt to cool the hair down again when placed in contact with a set of flat cooling and clamping plates mounted on the inside surfaces of the tongs.

However this approach to hair cooling using TEC devices is not thermally effective or efficient due to the proximity of the hot components of the TEC device's cold components, and as conceded by the objectives of U.S. Pat. No. 8,347,879. The thermoelectric components used in these devices are able to function effectively only for short periods of time with relatively small volumes of hair before heat starts to bleed over from the hot components to the cold components. This causes the device to become unbalanced with the cold components warming up. A user must then abandon the hair treatment process or wait for the tongs to shed this excess heat before they will function again to effectively cool hair.

As indicated above the device described in U.S. Pat. No. 8,347,879 aims to address these deficiencies through providing further heat sinks, fans or flows of refrigerant coolants in an attempt to maintain a low temperature on a flat hair cooling contact plate.

In the case of both of these documents a relatively complicated, bulky and expensive implement is disclosed. These devices struggle to perform in a cooling role for extended periods of time and can be distracting and noisy to use when cooling fans are provided.

Furthermore, these types of devices require a connection to a source of electrical energy, necessitating the provision of a power supply cord leading from a mains power outlet to the handheld styling implement. This power cord causes an inconvenience to hairstylists, impeding their freedom of movement when styling hair.

It would therefore be of advantage to have both an improved method and apparatus for a low temperature hair treatment process which addressed any or all of the above issues or at least provided the public with an alternative choice. In particular it would be of advantage to have improvements over the prior art with a simple construction deployed in a known form of hairstyling implement or tool. Improvements over the prior art which reduced hair treatment times and which could be used to treat large volumes of hair over long periods of time would also be of advantage, as would improvements which allowed for the application of both hot and cold treatments, or cold treatments in isolation.

DISCLOSURE OF INVENTION

According to one aspect of the present invention there is provided a hair treatment apparatus adapted to reduce the temperature of hair, the apparatus including at least one thermal energy storage core arranged to draw heat out of hair wherein said at least one thermal energy storage core is arranged to cool treated hair to a temperature below 0° Celsius.

According to a further aspect of the present invention there is provided a hair treatment apparatus adapted to reduce the temperature of hair, the apparatus including at least one thermal energy storage core arranged to draw out and store heat from hair being treated, a thermal energy storage core being formed from a material that experiences a phase change when cooled below 0° Celsius.

According to a further aspect of the present invention there is provided a hair treatment method characterised by the steps of
  i. cooling a thermal energy storage core provided by a hair treatment apparatus, the thermal energy storage core being cooled to below 0° C.
  ii. exposing hair to be treated to the thermal energy storage core of the apparatus to extract heat from the hair and reduce the temperature of the hair.

According to another aspect of the present invention there is provided a conditioning hair treatment method characterised by the steps of
  i. cooling a thermal energy storage core with a thermal connection to at least one contact surface to below 0° C.,
  ii. contacting hair to be treated with said at least one contact surface to extract heat from the hair and reduce the temperature of the hair.

According to a further aspect of the present invention there is provided a hair treatment apparatus substantially as described above which includes a contact housing configured to enclose the thermal energy storage core.

According to another aspect of the present invention there is provided a hair treatment apparatus substantially as described above wherein the contact housing is arranged to confine a fluid thermal energy storage core.

According to a yet further aspect of the present invention there is provided a hair treatment apparatus substantially as described above wherein the contact housing defines at least one contact surface, said at least one contact surface or surfaces enclosing an area occupied by the thermal energy storage core.

Preferably the contact surface or surfaces of a contact housing enclose a volume occupied by the thermal energy storage core.

The present invention is arranged to provide both a method of and apparatus for hair treatments. Reference in general throughout this specification will predominantly be made to the invention providing a conditioning hair treatment apparatus. However those skilled in the art will also appreciate that a method of using such an apparatus to treat hair is also within the scope of the invention.

Those skilled in the art will also appreciate that in some embodiments the invention may be used in combination with other forms of hair treatments if required. For example, in some instances the invention may be used immediately after a treatment that applies high temperatures to hair being treated. Reference in general throughout this specification will however be made to the invention providing a cold temperature hair treatment in isolation. Those skilled in the art will appreciate that alternative approaches, which combine different types of treatments, are also within the scope of the invention.

Such an apparatus includes at least one thermal energy storage core which in preferred embodiments is surrounded and enclosed by a contact housing. This contact housing defines at least one contact surface which is arranged to have a hair placed in contact with it during the treatment process.

In a preferred embodiment the contact housing and the contact surface or surfaces it provides may be formed from a waterproof and thermally conductive material. These types of materials can be used to capture or retain liquid based thermal cores while also allowing heat to be drawn from treated hair and to travel through to the core material. Furthermore a thermally conductive housing material allows for cooling of the thermal core itself both before and after completion of a hair treatment. This thermally conductive material also prevents strands of hair sticking to the contact surface at low temperatures.

In a preferred embodiment a contact surface may be formed from thermally conductive material.

For example, in various embodiments a contact surface may be formed any one or combination of metal and/or thermoplastic materials. For example in various embodiments a contact surface may be formed by any one or combination of aluminum, copper, steel, polyethylene, polyamide, polycarbonate, polyvinyl chloride, polypropylene or polyethylene terephthalate. However those skilled in the art will appreciate that other types of appropriate materials may be used in this role and reference to the above should not be seen as limiting.

The thermal core and contact housing of the invention may be used to implement a variety of different types of hair treatment devices. For example in some embodiments the invention may be implemented in conjunction with a handheld styling tool or implement—such as a set of clamping tongs or a brush. In other embodiments the invention may not necessarily be implemented with a handheld configuration, and may—for example—form a hair roller or hair curler which is installed on the head and attached to a lock of hair for some time. Those skilled in the art will appreciate that the particular application in which the invention is deployed will determine the shape or form factor of the contact housing provided.

In a preferred embodiment a contact housing may have a shape or dimensions which enclose or define a volume. Having a contact housing with a three-dimensional form enclosing a volume provides one or more contact surfaces over which hair can be wound while still being retaining in direct physical contact with the housing. This approach therefore maximises surface area contact between the housing and the hair being treated.

By maximising contact surface areas this allows long locks of hair to be treated in one operation quickly and effectively with more of the hair lock or strand being contacted than with prior art devices.

Reference throughout this specification will also be made to a contact housing being provided with a single substantially curved and continuous contact surface which encloses the volume occupied by the thermal storage core. In some preferred embodiments this contact housing may be provided with a circular or semicircular cross-section or profile, defining a relatively flat base and a curved upper surface which runs the length of the housing.

However those skilled in the art will appreciate that in other embodiments a contact housing may be provided with a plurality of separate and discrete contact surfaces which need not necessarily be adjacent to or connected to one another. For example, in one alternative embodiment a contact housing may be formed by a substantially rectangular element with four long distinct contact surfaces running along a main longitudinal axis. Those skilled in the art will appreciate that in various embodiments a contact housing may define a single continuous contact surface, or a number of distinct surfaces with different orientations.

Again however those skilled in the art will appreciate that other forms and arrangements of contact housings may be provided in accordance with the present invention.

In some embodiments a contact housing may be formed from multiple layers or combinations of components. For example, in one alternative embodiment a contact housing may be formed from an inner containment liner arranged to retain or locate a thermal storage core, in addition to an outer contact layer formed from a different material to the inner liner. In such embodiments the materials used to perform either the core retention functions or the contact surface functions may be selected based on the different roles to be performed.

However in a preferred embodiment a contact housing may be formed from a single layer of material with its interior surface being used to retain a thermal core and its exterior surface being used to provide one or more contact surfaces.

Reference in general throughout the specification will also be made to a contact housing being formed from a single layer of material—although those skilled in the art will appreciate that alternative arrangements of the invention are also within its scope.

In some embodiments a contact surface may also define one or more surface projections or surface structures. These structures may be employed in various roles depending on the form factor or arrangement of the apparatus implemented. For example, in some embodiments additional surface projections or structures may be provided extending from a contact surface which separate strands of hair placed in contact with the housing. Such structures may also guide the passage of hair moved over or through a contact surface or surfaces in other embodiments, or may promote the formation of variations in the alignment or arrangement of hair placed in contact with the housing. Furthermore in yet other embodiments these projections or surface structures can function to reduce stray static electrical charges which can build up during the treatment process as hair is moved over a contact surface to reduce flyway hair.

In some embodiments a contact surface may be provided in association with a condensation promotion element. A condensation promotion element can encourage moisture to condense on or near a contact surface, thereby providing a source of water in conjunction with hair being treated by the invention. For example, in some embodiments a condensation promotion element may be formed by a strip or section of metal adhered to the exterior of a contact surface. In some embodiments this condensation promotion element may be achieved with a hydrophilic, hydroscopic and hydrophobic coatings or nano coating applied to a contact surface. These forms of coatings may attract, channel or repel moisture to transport moisture to a location so to be rapidly taken up into the hair being treated.

In some embodiments a contact surface or the contact housing may include one or more thermal transfer elements. Such elements may be provided to increase the rate of heat transfer between a contact surface and the interior thermal storage core enclosed by the housing.

For example in some embodiments a thermal transfer elements may be provided by a metal shaft which projects from a contact surface into the interior of the volume occupied by the thermal storage core. In a further preferred embodiment this metal shaft may also extend out from the interior of the contact housing to form at least a portion of a contact surface from the same metal material. This metal thermal transfer element can therefore promote rapid heat transfer from hair contacting a relatively large metal surface area into the interior of the thermal storage core.

In a preferred embodiment a hair treatment apparatus may also include a handle attached or connected to the contact housing. A handle may in some embodiments be configured to locate a single contact housing, whereas in other embodiments a single handle may locate two or potentially more contact housings and associated thermal storage cores.

Those skilled in the art will appreciate that the particular form and arrangement or shape of such a handle will depend on the particular application in which the invention is employed. For example, in some embodiments the invention may be adapted to provide a hairbrush, where a single handle is engaged with a single centrally mounted contact housing and thermal storage core. In yet other embodiments the apparatus may take the form of a set of clamping tongs, where a handle locates a pair of complimentary opposed contact housings which can be pivoted together to clamp a lock or strand of hair. In yet other embodiments a handle may be provided as part of an application system for hair roller arrangements, allowing a user to position a roller formed by a contact housing within a user's hair and then subsequently detach the handle once the roller is in place.

In yet further embodiments a handle may be provided from two or more separate components which are linked together, each component being arranged to receive a removable thermal storage core. For example, in some embodiments, a handle may be provided by two open receiving shells which orient a pair of thermal storage core housing to form a clamp or tong like treatment apparatus. These two shells can also preferably be linked together by a flexible strip which allows the two exposed housing contact surfaces to be pushed toward each other to perform a hair clamping operation.

Again those skilled in the art will appreciate that the specific form or arrangement of the handle and contact housing or housings used will be dictated by the particular application in which the invention is employed. Furthermore additional features of the invention may be provided in various implementations, such as—for example—styling projections or hair alignment bristles when the apparatus provided is arranged to form a brush.

Reference in general will however be made throughout this specification to the apparatus provided being in the form of a set of handheld hair clamping tongs where the handle locates a pair of complimentary opposed contact housings and thermal storage cores. Those skilled in the art will appreciate that the invention may be provided in conjunction with other forms of hair treatment apparatus and reference to its use in tongs should not be seen as limiting.

In a preferred embodiment a handle may be formed from or include one or more components which perform as thermal insulators. For example, in some embodiments a handle may be more formed from a thermally insulative material such as a dense plastic, foam, elastomer or rubber material. In other embodiments only portions of the handle which are held by a user may be formed from or coated with thermally insulative materials.

In a preferred embodiment a handle may provide a contact housing connector or connectors which are configured to minimise heat transfer and exchange between the handle and the thermal storage core and contact surfaces. For example, in some embodiments the area of contact between the housing and handle may be minimised by at least one thermal break, with physical connections between these components being provided by thin spines, ribs or spacers. These features can provide air gaps between these components and reduce the surface area contact between the handle and the thermal storage core and contact surfaces. This is important so heat generated through hand movement of the hair stylist during use can generate heat (friction of movement) and hand body warmth that would otherwise be exchanged into the thermal storage core.

In some embodiments a contact housing may be configured to project out and away from the handle, maximising the surface area of the contact housing which can be placed in contact with the hair of a user.

In yet other embodiments the components of a handle may form an open shell arrangement, enclosing the sides of a housing while leaving its contact surface or surfaces exposed.

In a preferred embodiments a contact housing may be provided with a removable connection to a handle, allowing a contact housing to implement a form of removable cartridge. In such embodiments this arrangement of the invention allows for the pre-cooling or freezing of a thermal storage core separate from a handle and prior to use of the apparatus. Furthermore a number of pre-cooled removable thermal energy storage cores may be kept on hand for use with a single handle, allowing the plurality of removable cooling cartridges to be swapped in and out as they extract heat from treated hair and the thermal storage cores heat up. In some embodiments these removable cooling cartridges may come in different sizes and shapes for different hair types and styling techniques and effects desired by the user.

In addition the connection scheme used between a handle and a contact housing may have a modular nature in some embodiments. In various embodiments this connection scheme may be provided by a mechanical attachment, magnetic attachment, or whereby the spines act as guides to secure the parts together. For example in some embodiments this connection scheme may be provided by a mechanically engaged clip where the parts of the clip together providing a positive registration and attachment. Mechanical clips can also be configured to provide a pleasant action and experience for the user when the thermal storage core and handle are separated and connected together.

By using a standard or modular connection scheme the same pre-chilled or free frozen thermal storage core may be used with a number of different handle configurations. Potentially the same core used with a set of clamping tongs may also be connected to the interior of a brush handle in such embodiments.

Reference in general throughout this specification will also be made to the contact housing having a removable connection to a handle and contact housings providing a removable cooling cartridge. Again however those skilled in the art will appreciate that other configurations of the invention are envisioned and reference to the above should in no way be seen as limiting.

In a preferred embodiment a handle may also include a temperature sensor and associated user indicator. This temperature sensor may be placed in close proximity to the contact housing, allowing the indicator to alert a user if the temperature sensed climbs above and acceptable maximum operating temperature. This indicator can therefore alert the user to the needs to either swap to a new pre-cooled core or to cease the treatment process until the current core can be cooled down again. For example in one further preferred embodiment a handle may include an LED light linked to a temperature sensor and associated control logic electronics. This light may be activated or change in colour or brightness when the temperature sensed rises above 0° C. or an equivalent maximum operational temperature. In some alternative embodiments this indicator may include thermo chromatic sensitive plastic or similar coating material that changes in colour as the temperature changes, or incorporate other thermally sensitive materials that exhibit a change in character using the energy or energy loss from the thermal storage core.

In a preferred embodiment a hair treatment apparatus provided by the invention may also include or engage with a base station arranged to receive at least a part of a contact housing. A base station provided by the invention can be employed to cool or potentially freeze solid the thermal storage core retained within a contact housing.

In various embodiments a base station can use a number of techniques to cool a thermal storage core. For example, in some embodiments standard expansion of gasses and compressor refrigeration and freezer technology may be employed. In other embodiments the temperature of a thermal storage core can be reduced by thermoelectric cooling devices configured in single-stage or multi-stage (being in series where one cools the other to achieve deep-cooling) arrangements of Peltier plates or junctions. In yet other embodiments a base station may rely on an existing mass of cold or frozen material placed in contact with a contact housing to reduce the temperature of the material making up the core. In yet other embodiments a base station may function as a heat pump, circulating heat extracted from one thermal core to an adjacent thermal core to be used in a heat treatment process. In such embodiments the circulated heat can be used to warm and heat a thermal storage core.

Sprays of treatment fluids employed with the present invention may also have a variety of forms or configurations. In some instances a combination of both the contact housing, thermal storage core and handle may be located inside a cooled enclosure used to form a base station. In other embodiments where a contact housing forms a removable cooling cartridge the contact housing only may be placed inside such a cooled enclosure. In yet other embodiments a base station may be arranged to receive one end only of a combined contact housing and handle, where in use the handle projects out from the base station while the contact housing is subjected to cooling. In yet other embodiments a base station may be arranged to receive or connect to a plurality of contact housings at one time.

Those skilled in the art will appreciate that in some embodiments relatively small base stations may be provided, allowing thermal storage cores to be cooled on a bench top or work surface adjacent to where hair is being treated. In this arrangement thermal storage cores held at a desired low temperature can be placed readily available at hand to a user, with used warmed storage cores being swapped out to the base station.

Reference in general throughout this specification will also be made to the invention incorporating or using at least one base station. However those skilled in the art will appreciate that alternative embodiments need not always employ such base stations. For example in one alternative embodiment a thermoelectric cooling system may be mounted within a handle and used to provide a cooling function in relation to adjacent is thermal storage cores.

In some embodiments the invention may also provide or include a treatment or hair cleaning and conditioning fluid application element. When hair is treated with cold temperature in the method specified it becomes more susceptible to take up and retain fluid which is advantageous for daily hair quality. A variety of different types of treatment fluids and hair lotions can have a beneficial effect on hair quality and health during low temperature hair treatments, with such an application element being used to deliver same on to or adjacent to a contact housing to be applied to and or taken up onto the hair surface or into the hair structure.

For example in some embodiments a handle may include or be associated with a reservoir of treatment fluid which can periodically deliver a spray of treatment fluid on to or in to a contact surface. In other embodiments a slow fluid release matrix material may be applied or connected to a contact surface to deliver fluid to hair placed in contact with this surface. In such embodiments these slow release matrix materials may be formed as a component connected to a contact surface, or may be provided by a material used to form the contact surface itself.

In some embodiments a treatment fluid application element may also include a cooling system to allow for precooling of the fluid which it delivers. Cooled treatment fluids again act to draw heat from the hair being treated, assisting the temperature reducing process employed by the invention.

In some embodiments a treatment fluid application element may be formed from or include a interchangeable cartridge or cartridges so the user can interchange different type of fluids and applicators to style, condition and care for their hair in different ways.

In a preferred embodiment a treatment fluid delivered in conjunction with the invention may be cooled or chilled liquid water, other hair cleaning or conditioning agents or repair products such as keratin. Delivering these fluids during the use of the invention acts to rehydrate, repair and further condition the hair being treated so that the application of a treatment fluid is more consistent and delivered at a saturation rate ideal for being effectively taken up by the hair. This can be contrasted with prior art approaches where such hair treatment products are applied manually by hand which achieves a less consistent and effective result. Delivering fluid, lotions or creams in this way can also have an additional cooling effect on the hair to promote a desirable treatment outcome.

In a preferred embodiment a thermal energy storage core may be formed by a material that experiences a phase change to a solid or liquid form when cooled below 0° C. In a further preferred embodiment this phase change may occur between −20° and 0° C. Materials which exhibit this characteristic will absorb thermal energy during the phase change from a solid to a liquid without exhibiting an increase in temperature during the transition. By selecting materials which undergo this phase change and exhibit enthalpy of fusion characteristics at a desirable low temperature the amount of thermal energy which can be stored by the core can be maximised and hence allows the operating capacity of the core to be maximised.

Preferably the present invention may be implemented with a thermal energy storage core which forms a liquid at temperatures above 0° C.

In preferred embodiments the invention may include a fluid thermal energy storage core which experiences a latent heat of fusion effect at approximately between 0° and −10° C.

In further preferred embodiments the material used to form the thermal energy storage core experiences a latent heat of fusion effect at approximately between −3° and −8° C. In a further preferred embodiment this material experiences a latent heat of fusion effect at approximately −8° C. degrees.

In these further preferred embodiments the invention is adapted to apply a specific cold temperature treatment in the range of −3° to about −8° C. The applicant understand that these temperatures produce a hygrally induced hysteresis in the hair, locking in the moisture within the hair for an extended period of time.

In a yet further preferred embodiment the thermal energy storage core may be formed by a material that experiences a solidification phase change at approximately −8° C. A wide range of cooling technologies can be employed to promptly reduce the temperature of a thermal storage core to or below −8° C., optimising both the energy storage capacity of the core while minimising the amount of time required to cool the core down to a temperature where it is ready to the use.

In a preferred embodiment the invention may include a water based thermal energy storage core which incorporates approximately a 3.5-15% by mass of ionic additives. In these embodiments one or more electrolyte materials may be added to water in these concentrations to form a solution with desirable thermal characteristics.

In a preferred embodiment a thermal energy storage core may be formed from saline solution. Saline is an inexpensive and readily available material which may be easily formed at concentrations which have a desired freezing point.

For example in a further preferred embodiment saline with a sodium chloride (NaCl) concentration of approximately 3.5% to 15% by mass may be employed in conjunction with the present invention.

Reference in general throughout this specification will also be made to saline solution being used to form a thermal energy storage core.

However those skilled in the art will appreciate that a range of alternative compounds may also be used in this role. For example, in various alternative embodiments a thermal energy storage core material is formed from any one or combination of different forms of gels, propylene glycol, hydroxethyl cellulose, vinyl coated silica gel, alcohols, liquid ammonia or compounds made or formulated to undergo endothermic reactions between −20 and 0° C. may be employed to form a thermal core.

The present invention in its various embodiments allows an effective hair cooling treatment method to be performed. The invention can be used to reduce combing modulus (an indication of the combing force which is a common attribute associated with hair treatments particularly hair conditioners making it softer) and thickness (hair bulk) in dry hair and can also offer benefits in use applications where a person wishes to 'touch-up' their hair but without having to fully wet it (i.e. take a shower).

Use of various embodiments of the invention has also been shown to cause the hair to take up and retain more moisture over time which keeps the hair in a healthier state. The invention has also been shown to reduce 'Hygral and Hydrothermal Fatigue'. Hygral fatigue is the damage that occurs to the hair fibre from the repeated process of expansion (when hair is wet) and contraction (when hair is dried). Often with existing hair treatment products and regimes the change from wet state to dry state is very fast with explosive heat from hot styling irons and blow driers. The constant expansion and contraction of the hair causes damage (weakening the hair cuticle and cortex). This invention can cause the hair to undergo a hygrally induced hysteresis which slows the process of the hair moving between states, reducing speed of change in expansion and contraction which causes severe hair damage.

Various embodiments of the invention have also been used to improve the shine, feel and curl definition of hair. The invention can be implemented as part of a flexible hair treatment system, allowing for cold temperature treatments in isolation, or cold temperature treatments in combination with existing high-temperature hair treatment processes.

In particular, various embodiments of the invention may be used to improve the quality of hair treated with high heat treatment equipment such as blow driers and hot tongs. Heat treatments cause substantial loss of moisture through explosive evaporation which is very damaging. Cold treatment used following high heat treatments has shown to further improve the combing modulus of straightened hair (becoming softer) contributing substantially more to the overall benefit of straightened hair if used following hot tong treatment. The invention also has been shown to influence the re-uptake of moisture, accelerating the recovery process which can be advantageous when considering that hair following hot straightening or styling is very dry. Cold treatments can therefore provide an effective step in reversing the moisture loss and damage caused by common high heat treatments.

The treatment process provided by the invention can also assist in achieving a more permanent set following high heat treatment. Anecdotal information suggests rapid cooling of hair immediately after heating (blow drying, hot irons, hot tongs and hot rollers) helps to achieve a more permanent set of the hair when compared to styling without subsequent cooling.

Thermal transitions in keratin (a key protein in hair) are strongly affected by water and depends on the amount present. Keeping water in hair is also important for good hair health. High heat treatment in any form causes a progressive loss of bound water, which changes the Glass Transition State of hair (i.e. its malleability as Keratin becomes softer when heated). Water absorbed in keratin exists in three forms: a) water absorbed on strong binding sites; b) water absorbed on weakly binding sites and or hydrogen bound to strongly absorbed water; and c) loosely bound or free water. At 100° C. free water and weakly bound water is removed. Above 140° C. strongly bound water is released (note most hot tongs operate above 190° C.). Water in all three sites plays an essential role in forming the super molecular structure of the keratin biopolymer.

Unlike hot treatments which remove moisture from the hair, this invention works with the moisture in the hair.

When locks or strands of hair make contact with the invention, the invention can create a spike in the specific heat curve of hair just below 0° C. causing water in the hair to undergo a phase. In this phase change state water stays in ambient hair and behaves like 'free' water allowing the hair to become more malleable and manageable. Hot dry hair treated with this invention can cause the hair to more rapidly take up moisture, which helps reform (return water more quickly) to these binding sites, setting the hair in the newly styled state. Because moisture is returned quickly and not slowly over time, the hair does not gradually deform losing the styled effect which is well known to occur with existing hot treatments.

Testing and research conducted in respect of various embodiments of the invention has shown:

Damp hair fibre (towel-dried or spritzer mist) treated with cold temperatures can withstand an 8% higher breaking load compared to untreated hair. Increased tensile strength.

Cold treatment following heat treatment (blow dry and hot tong) reduces the strength loss in the fibre caused by the heat by 4%. Reduces the effect of heat on tensile strength.

Following hot blow dry and hot tong, the combing modulus of hair fibre improves by 15%. A −8 C cold treatment within 10 minutes further improves the combing modulus to 41%. This effect is enduring when after 4 hours the cold treatment is contributing four times the effect of heat treatment on combing modulus—after 4 hours, heat treatment improves the combing modulus by 5%. Cold treatment contributes a further 20% change.

Using a scanning electron microscope (SEM) the cuticles on the fibre exterior are shown to be less lifted and in healthier condition following 30 days of continuous use (at least once a day).

After 30 days of longitudinal use the required breaking force of a cold treated fibre increases by 20% showing an increase in strength over time and subsequent improved health of hair. This test case is considered to be statistically significant.

For the same subject, the breaking extension reduced by 23% during the same period. This is the linear distance the fibre stretches before breaking. A reduction in breaking extension is considered a factor in hair health as keratin health is more plastic than elastic.

When the invention is configured in the form of a compressive device (tong) it provides a mechanical effect of physically compressing the hair and applying tension to it, which can cause some level of fibre alignment; in addition to a static electricity 'earthing' effect, which could reduce static-induced issues with the hair.

In its various embodiments the present invention therefore implements a method and apparatus for a low temperature hair treatment process. The invention may be implemented as part of a range of well-known hairstyling tools and implements and can function effectively over long periods of time to cool large volumes of hair quickly.

BRIEF DESCRIPTION OF THE DRAWINGS

Example embodiments of the invention are now discussed with reference to the drawings in which:

FIGS. 2a, 2b, 2c and 2d show a range of additional views of the embodiment of the invention implemented with respect to FIG. 1b, while FIG. 2d shows a side view of a set of contact housings used in this embodiment in isolation from the handle.

FIGS. 4a and 4b show a side cross-section and expanded view of the apparatus of the invention provided in a further embodiment to pass through and align hair fibres FIGS. 4c and 4d show the action of a number of hair alignment projections extending from the contact housing of the embodiment shown in FIGS. 4a and 4b.

Further aspects of the invention will become apparent from the following description of the invention which is given by way of example only of particular embodiments.

BEST MODES FOR CARRYING OUT THE INVENTION

Figure 1A:
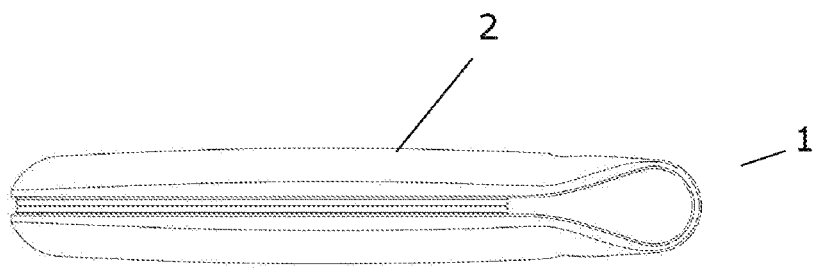
FIGS. 1a, 1b and 1c show side views of three different embodiments of the invention used to implement a set of handheld hair treatment gliding and compressing apparatus
Figure 1B:
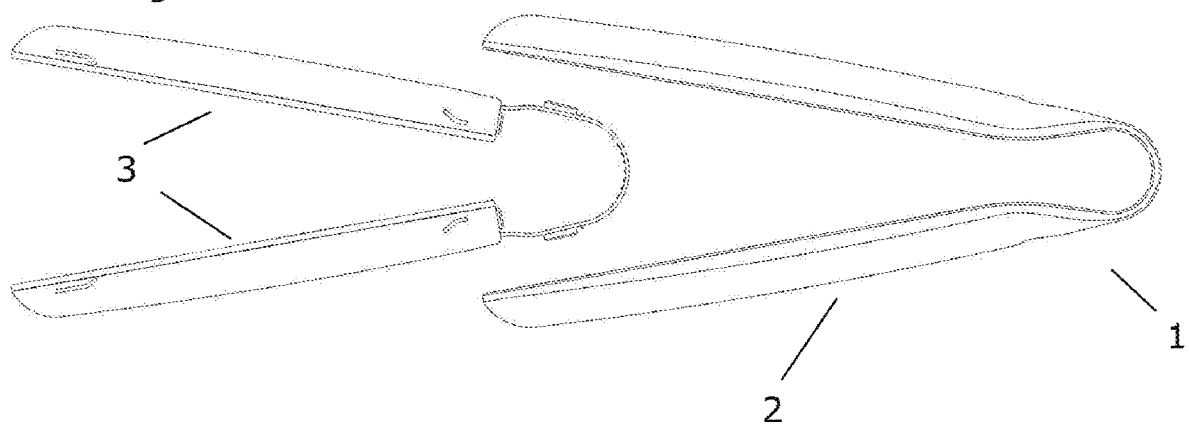
Figure 1C:
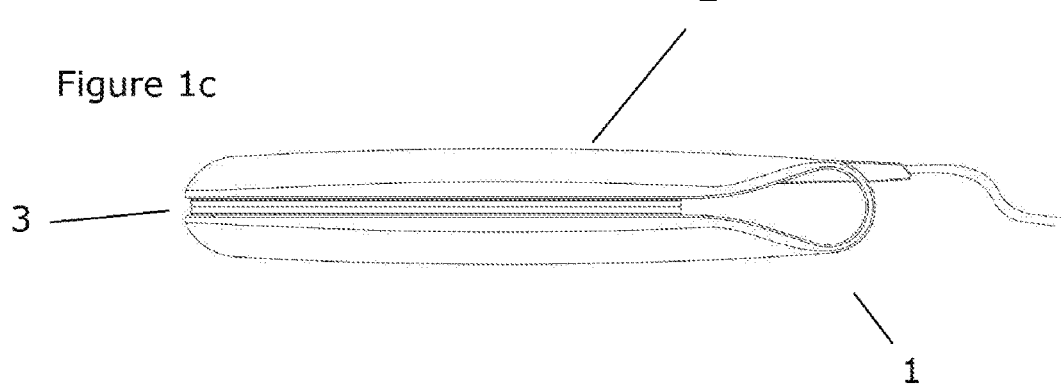

FIGS. 1a, 1b and 1c show side views of three different embodiments of the invention used to implement a set of handheld hair treatment apparatus 1.

In each embodiment the tongs provided are formed from a handle section 2 which is engaged with a pair of contact housings 3. The contact housings are used to locate and enclose a thermal energy storage core (not shown). The exterior of each contact housing defines a contact surface for hair to be treated by each device.

In each of these embodiments the handle 2 is arranged to pivot to open and close the jaws formed by the apparatus, moving each contact housing 3 and associated thermal core towards and away from each other. Hair to be treated can be placed into the interior of the apparatus to come into physical contact with either or both of the contact housings 3 connected to each handle to touch and or compress hair.

In the embodiment shown with respect to FIG. 1a each of the pair of contact housings are permanently connected to the handle 2. In the embodiment of FIG. 1b the contact housings 3 are removable from the housing, providing these components with a removable cartridge configuration. In the embodiment shown with respect to FIG. 1c the contact housings 3 are again permanently connected to the housing, with an electronic cooling device (not shown) mounted within the handle to cool each associated thermal core.

Figure 2A:
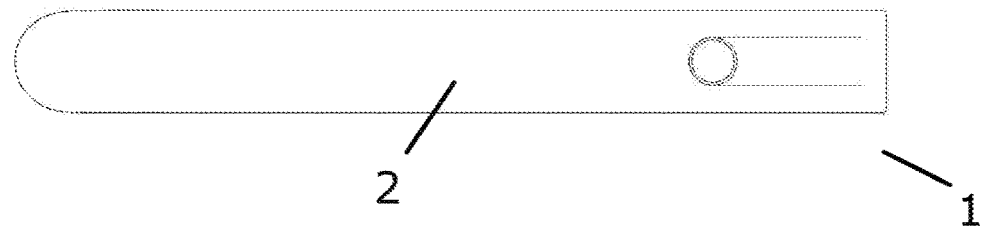
Figure 2B:
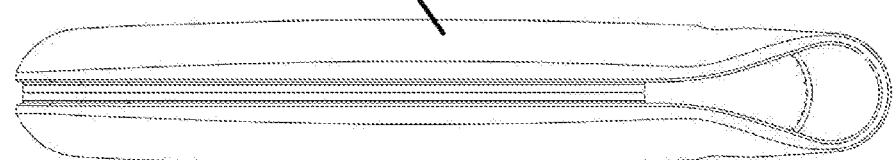
Figure 2C:
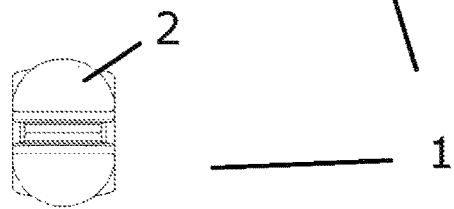
Figure 2D:
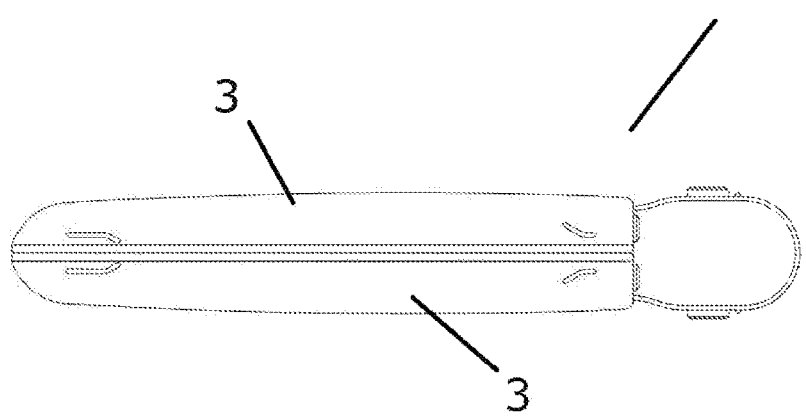

FIGS. 2a, 2b, 2c and 2d show a range of additional views of the embodiment of the invention implemented with respect to FIG. 1b. FIG. 2d shows a side view of a set of contact housings used in this embodiment in isolation from the handle.

FIGS. 2a and 2b shows plan and sides view of the cooling apparatus 1 when closed, while FIG. 2c shows an end view, and FIG. 2d shows a side view of the contact housing 3 removed from the handle 2.

Figure 3A:
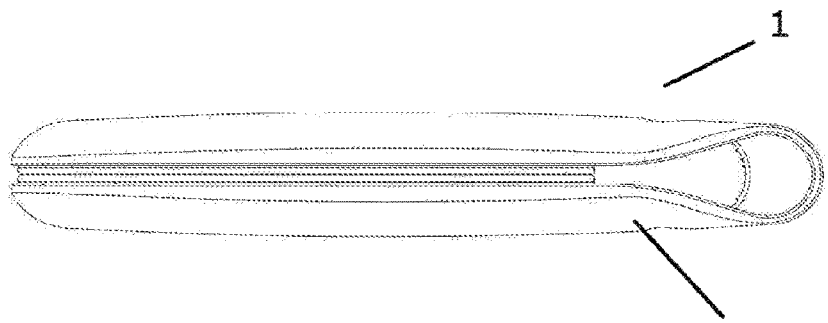
FIGS. 3a through 3d show in further detail how two embodiments of the invention can be employed.
Figure 3B:
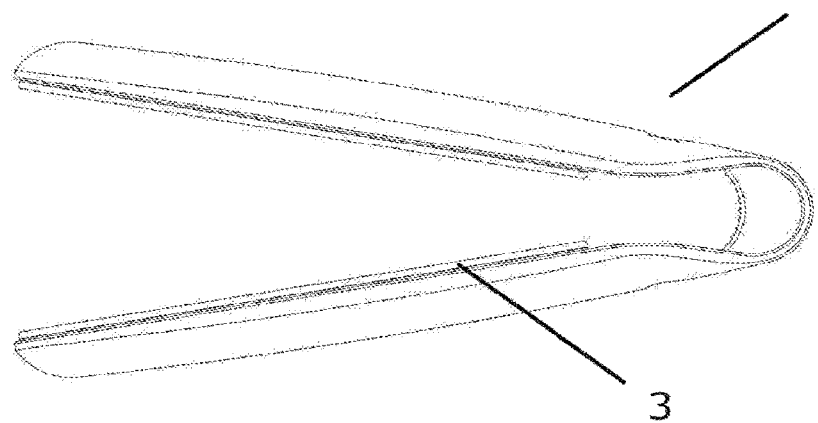
Figure 3C:
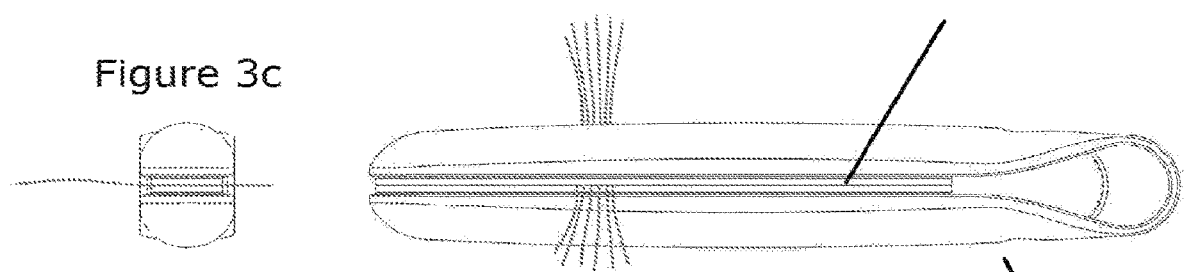
Figure 3D:
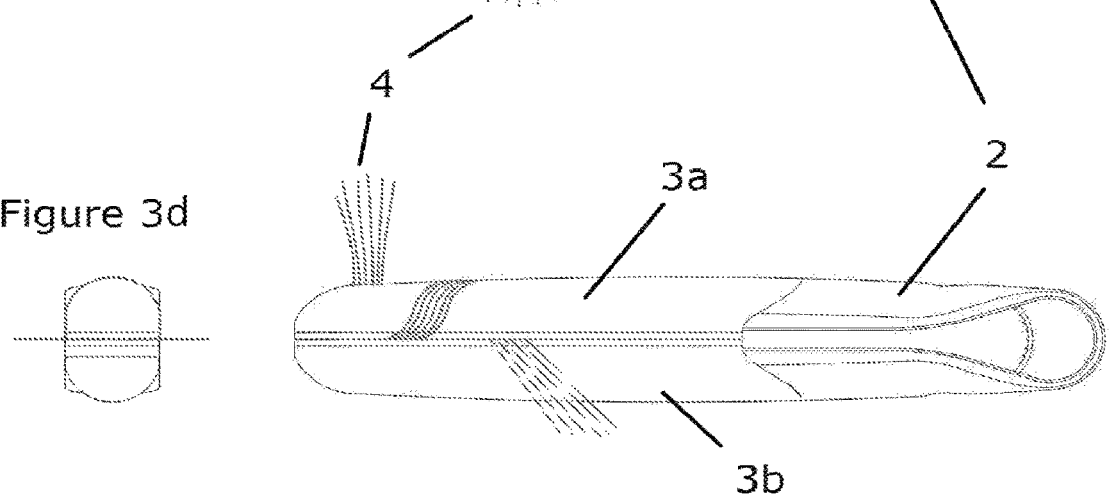

FIGS. 3a through 3d show in further detail how the embodiment of the invention shown in FIG. 2 can be employed. FIGS. 3a-c show the use of the embodiment shown with respect to FIG. 2, while FIG. 3d shows the use of an embodiment when the handle forms a stub or sheath from which the contact housings project.

FIG. 3a shows the initial closed state of the apparatus 1 while FIG. 3b illustrates the pivoting action of handle 2 used to open the apparatus to insert a lock of hair into its interior. 3b is in a material relaxed state while 3a is in a material compressed state, thereby providing an inherent outward spring effect when compressed.

FIG. 3c illustrates one possible treatment operation facilitated by the invention in this embodiment. As can be seen from FIG. 3c a lock of hair 4 can be clamped between the opposed contact housings 3 and thermal cores with the hair drawn over these contact surfaces to reduce its temperature.

FIG. 3d illustrates a further possible treatment operation facilitated by an embodiment where the handle 3 forms a short stub or sheath from which the contact housings project. As can be seen from FIG. 3d a lock of hair 4 may be wound around the upper contact housing 3a and then clamped against the lower contact housing 3b to reduce its temperature. This approach places a significant amount of hair in contact with the cold contact surfaces in one action, as compared with the action of FIG. 3c.

FIGS. 4a and 4b show a side cross-section and expanded view of the apparatus of the invention provided in a further embodiment. FIGS. 4c and 4d show the action of a number of hair alignment projections 5 extending from the single contact housing 3 provided in this embodiment.

In this embodiment the invention is used to pass through hair to align fibres in a brushing action where a handle 2 defines a central locating cavity 6 which receives a single contact housing 3 and associated thermal core. The exterior sidewalls of the handle 2 used to form this cavity also define a number of projections 5 which extend from the contact housing to form the bristles or fibre alignment projections. As can be seen from FIGS. 4c and 4d a user can run the projecting bristles of the brush through a head of hair 4, placing the thermal core in close proximity to reduce the hair temperature.

Figure 5:
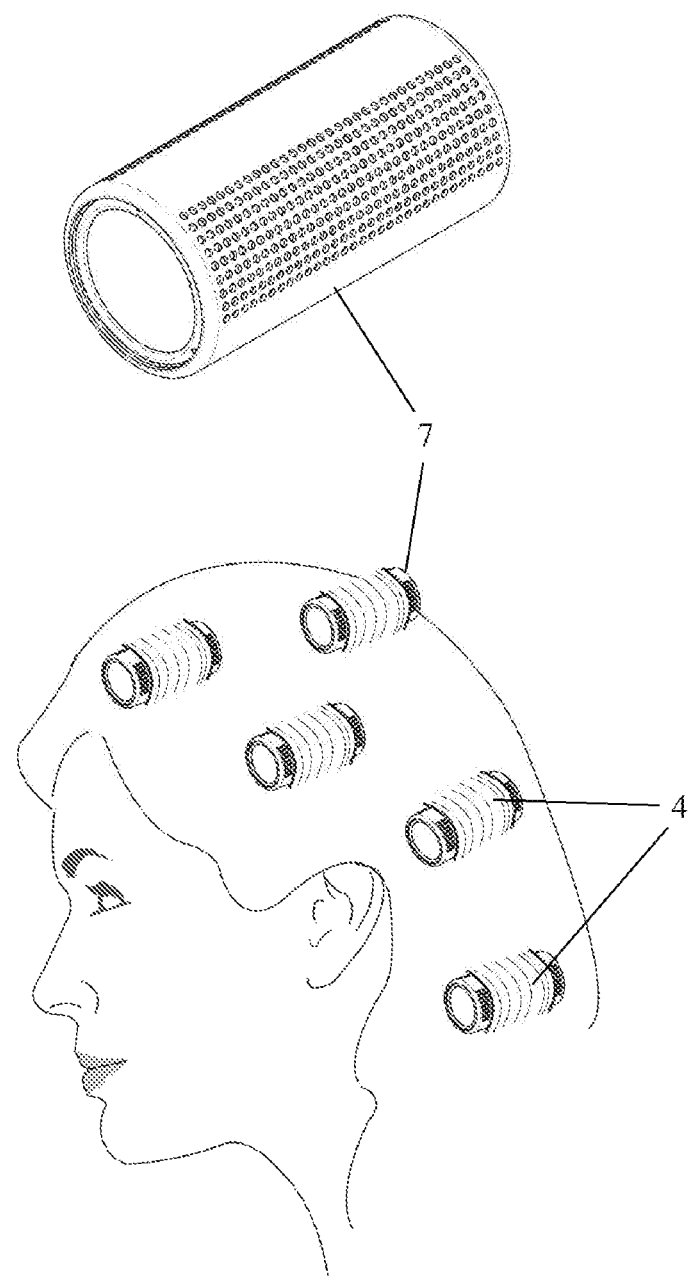
FIG. 5 shows a perspective view of the apparatus of the invention provided in yet another embodiment be located within hair in various styling forms.

FIG. 5 shows a perspective view of the apparatus of the invention provided in yet another embodiment. In the embodiment shown the invention provides a contact housing in the form of a hair roller or curler 7. In use the roller has a lock of hair 4 wound around its cylindrical perimeter and is secured in place in the hair for a period of time.

FIGS. 6a, 6b, 6c and 6d show several different implementations of the contact surfaces of a contact housing. In these embodiments the contact housing is formed from two co-radial layers of material, where the interior or underside layer forms an enclosure for the thermal core, and the outer topside layer provides a thermally conductive contact surface for the hair of the user.

Figure 6A:
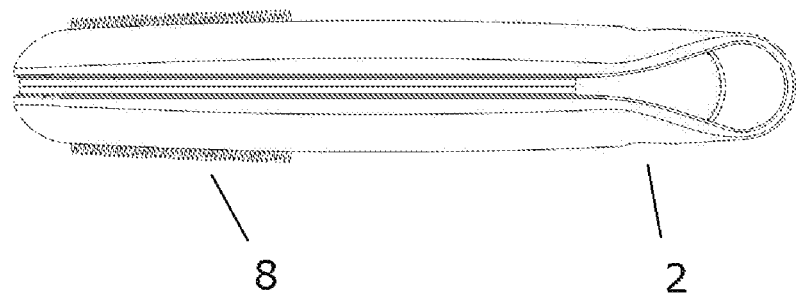
FIGS. 6a, 6b, 6c and 6d illustrate a range of different types of contact housing and contact surfaces implemented in various embodiments

In the embodiments of FIG. 6a the exterior layer of the handle 2 defines a number of hair styling projections 8. The arrangement of FIG. 6a allows the strands of a user's hair to be aligned.

Figure 6B:
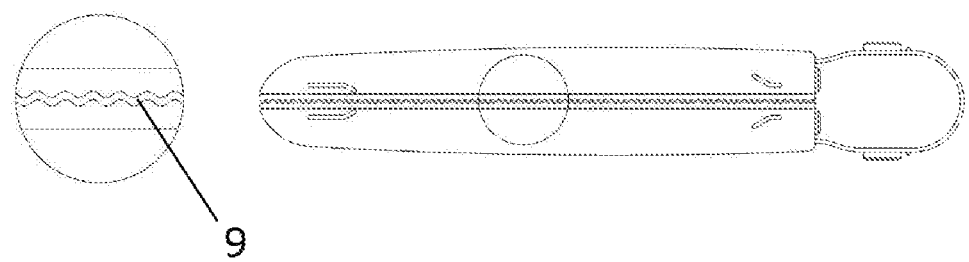
Figure 6C:
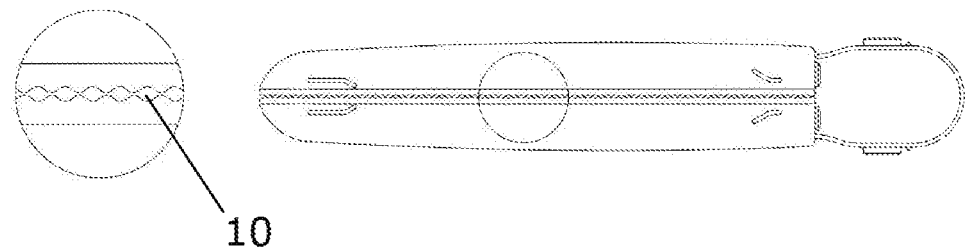

FIGS. 6b and 6c show embodiments where the two opposed contact housings defines a number of hair combing apertures 9, 10 when clamped together. This embodiment maximises the surface area contact between the hair and cold contact surfaces. The apertures 9 of FIG. 6b provide for a crimping effect as hair is run through these projections and over the cold contact surface. Alternatively the apertures 10 of FIG. 8c provide for a combing effect as hair is run through these projections and over the cold contact surface.

Figure 6D:
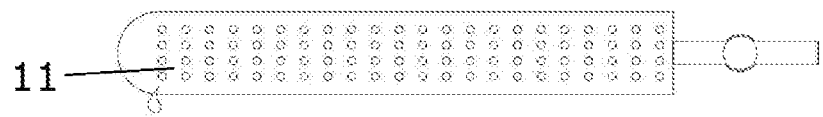

FIG. 6d shows the implementation of a treatment fluid application element formed by a material used to apply and deliver a fluid hair product lotion into the hair. The arrangement of FIG. 6d shows the exterior surface of the contact housing formed from a perforated surface to exchange fluid from a solid, fluid encapsulated or sponge like layer 11 soaked or dipped in a cooled treatment fluid. This treatment fluid is slowly released through the apertures shown onto the hair of the user as the hair is run over the contact housing. Those skilled in the art will also appreciate that alternative forms of treatment fluid application elements may function in a similar manner, but deliver fluid from a reservoir instead of a matrix material.

FIGS. 6a-6d also show projections and surface details made in forms and materials that promote condensation and or the management and effective application of this moisture and treatment fluids into hair.

FIGS. 7a through 7f illustrate a range of different types of base station 12 which can be employed with the invention in various embodiments.

Figures 7A, 7B, 7C:
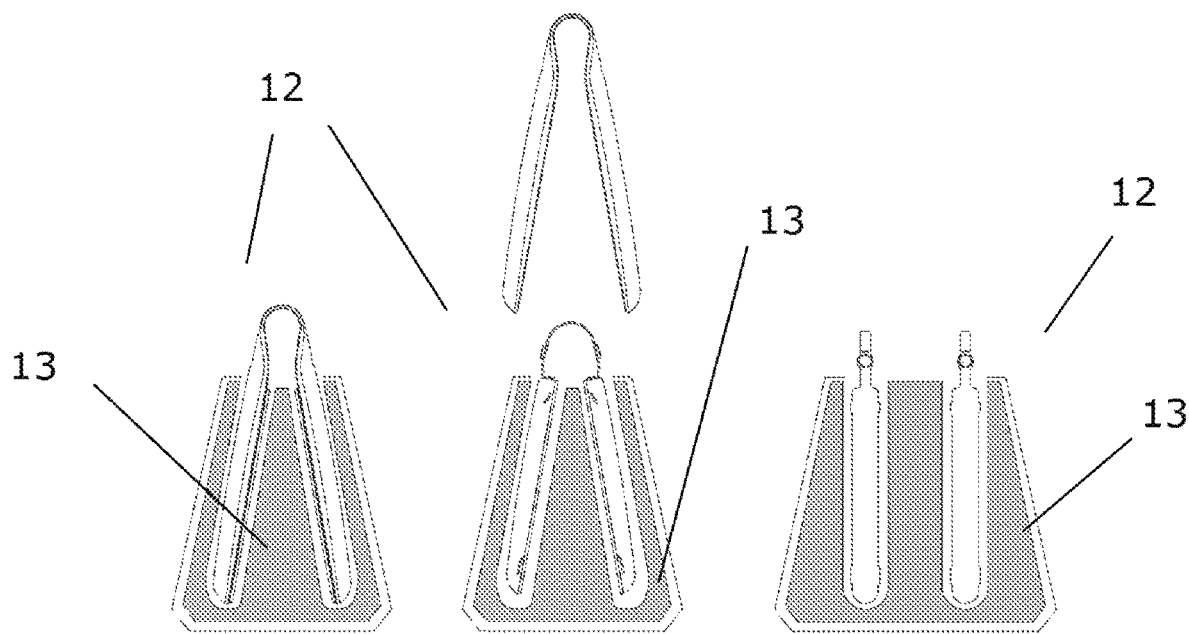
FIGS. 7a through 7f illustrate a range of different types of base stations implemented in various embodiments.
Figures 7D, 7E, 7F:
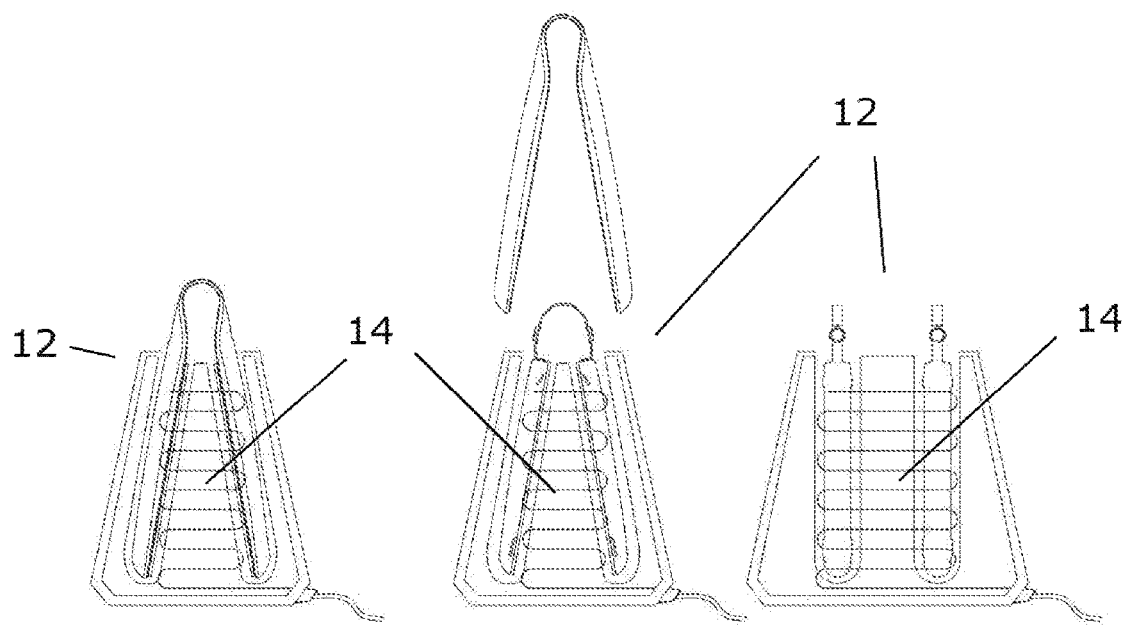

The base stations implemented with respect to FIGS. 7a through 7c use a pre-cooled thermal mass 13 sited in the base and sidewalls of each base station to produce a cooling effect. The base stations of FIGS. 7d through 7f are electrically powered and use cyclic, gaseous and or thermoelectric refrigeration 14 in the interior of each base station.

FIGS. 7a-7f also show internal volume for cold core storage.

These base stations are arranged to define a receiving cavity into which the contact housing or housings of a treatment apparatus can be inserted. Various forms of base station can be provided which receive cooling cartridges formed by contact housings removed from handles (FIGS. 7b, c, e and f) or which receive contact housings still connected to handles (FIGS. 7a, and d). In a range of embodiments base stations can also receive and cool a number of contact housings and associated thermal cores at the same time, as shown in the embodiments of FIGS. 7c and f. As shown by these figures the central cavity of the base station can receive a contact housing in isolation, or a contact housing connected to a handle.

Figure 8A:
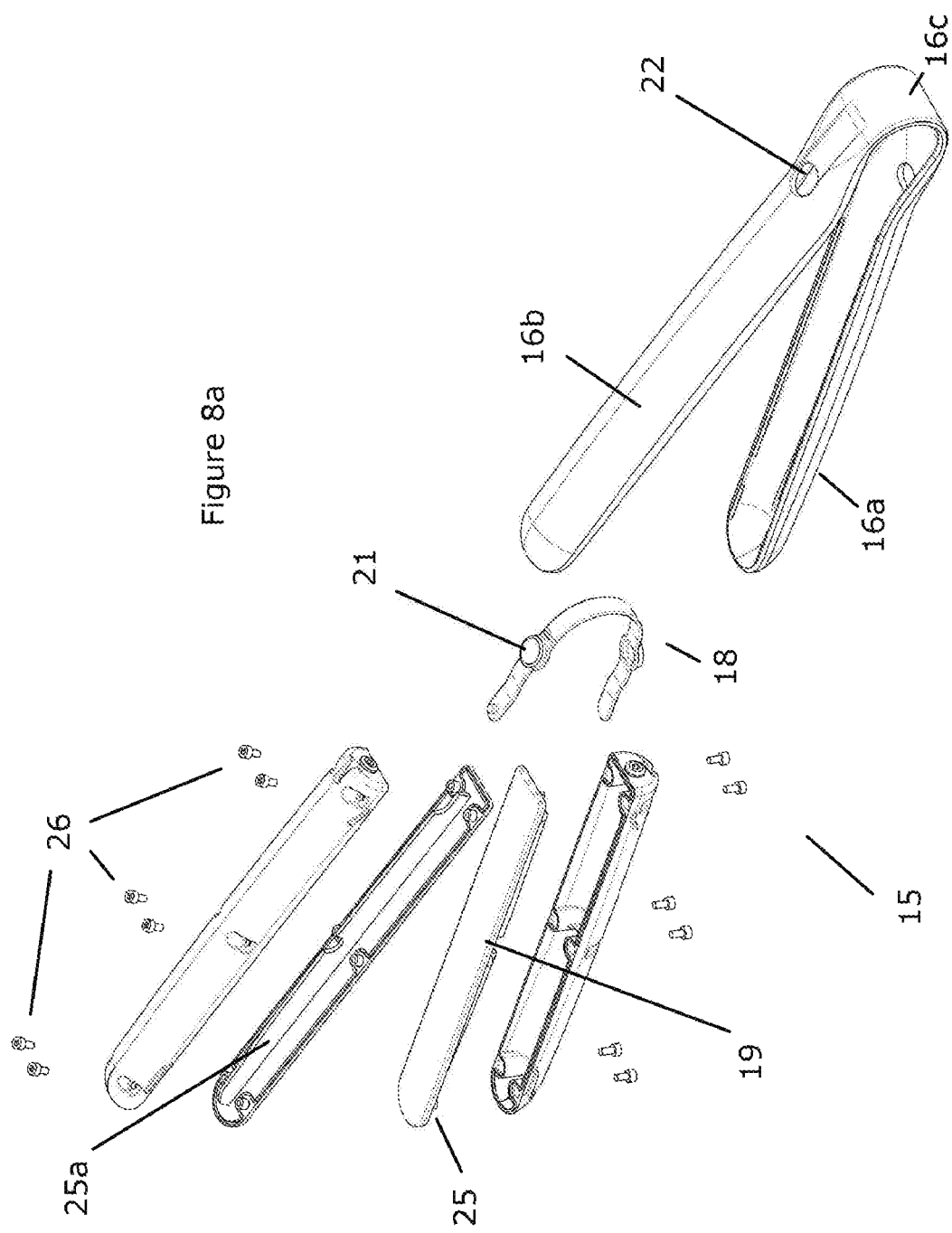
FIG. 8a shows an exploded view of a hair treatment apparatus as provided in accordance with a further embodiment of the invention.
Figure 8B:
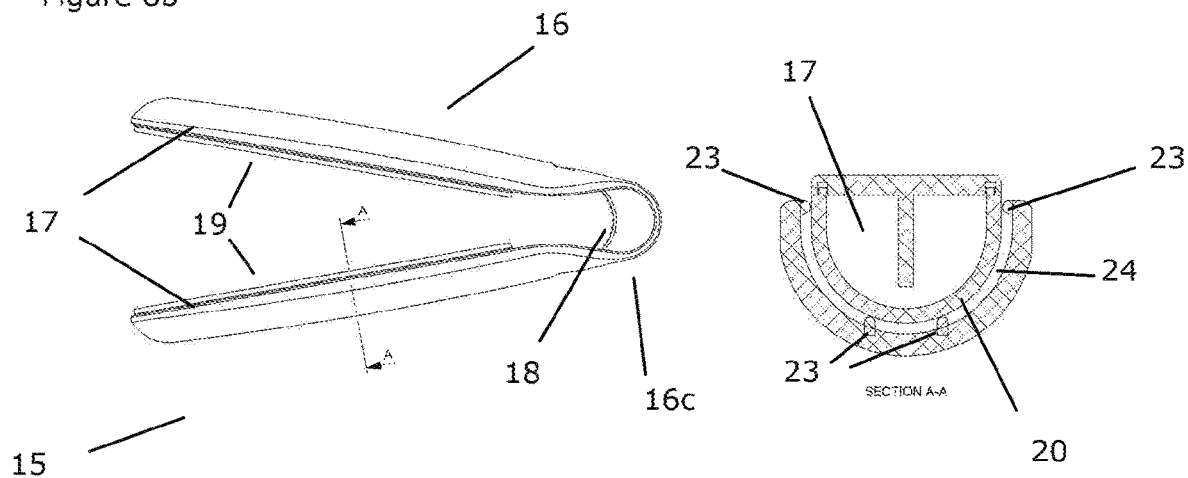
FIGS. 8b and 8c show a side and end cross-section view of the hair treatment apparatus of FIG. 8a, and FIG. 8d shows a perspective view of a thermal transfer element integrated into the apparatus shown with respect to FIGS. 8a-8c.
Figure 8C:
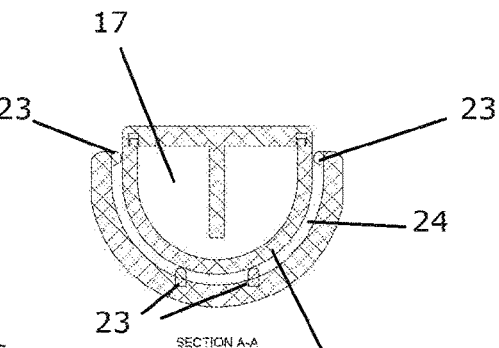
Figure 8D:
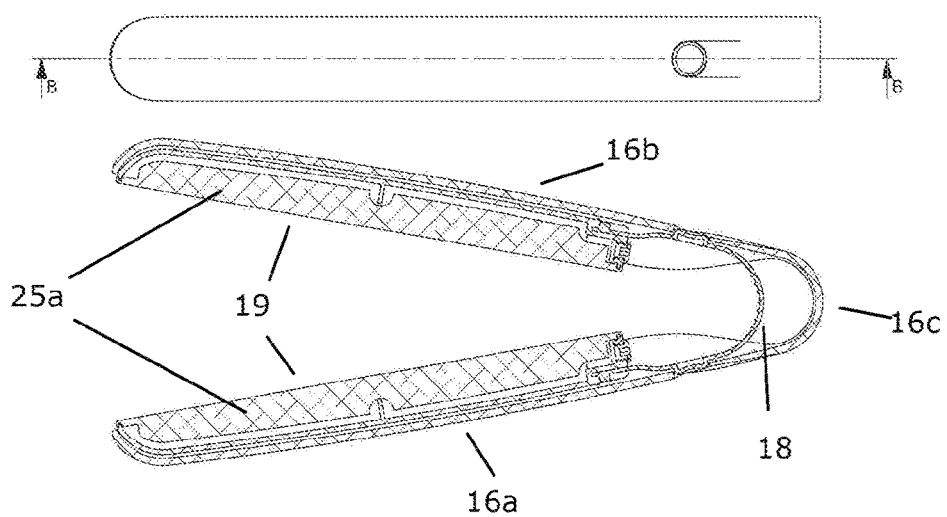

FIGS. 8a through 8c show a number of views of the components employed to form a hair treatment apparatus 19 in accordance with a further embodiment.

The apparatus 15 includes a handle 16 used to surround a pair of removable thermal storage cores 17 connected together by a body strap 18.

The handle includes two clamping arm components which are linked together by a flexible joint 16c, each component being arranged to receive a removable thermal storage core 17. The thermal cores are each enclosed within a housing 20 which defines a contact surface 19.

The handle is formed from two open receiving shells 16a, 16b which retain and orient the pair of thermal storage cores to form a clamping or tong like treatment apparatus. Each side of the handle encloses the sides of a core housing while leaving its contact surface 19 exposed. The flexible joint 16c allows the two exposed housing contact surfaces to be pushed toward each other to perform a hair clamping operation.

Each core is locked in place within the handle by the action of a locking projection 21 engaging with a complementary locking cavity 22 provided in the handle. The cores can be removed from the handle by each locking projection 21 being forced inwards, allowing a user to grasp the body strap 18 to pull both cores out of the handle.

As can be seen from the cross section view of FIG. 8*c*, each housing is sited within a side of the housing 20 to rest against a series of guide rails 23. These guide rails provide a thermal break 24 between the core housing and the handle, minimising heat transfer between these components. This provides a thermal break in the interior of the handle to form an air gap between the majority of the contact surface and the handle which receives the contact housing. Direct connections are made with the housing only by the guide rails to which limit the surface area contacts between these components. FIG. 8*c* also illustrates the hollow nature of the contact housing, enclosing a volume used to contain the thermal energy storage core.

In the embodiment shown each contact housing includes a thermal transfer element 25 formed from aluminium. The transfer element is connected to the main body of the housing by a set of screws 26.

As can be seen from FIGS. 8*a* and 8*c* in particular, this metal thermal transfer element 25 provides a metal shaft 25*a* which projects into the interior of the volume occupied by the thermal storage core. The same metal component also extends out from the interior of the contact housing to form the contact surface 19. The metal thermal transfer element therefore promotes rapid heat transfer from hair contacting a relatively large metal surface area into the interior of the thermal storage core.

Figure 9A:
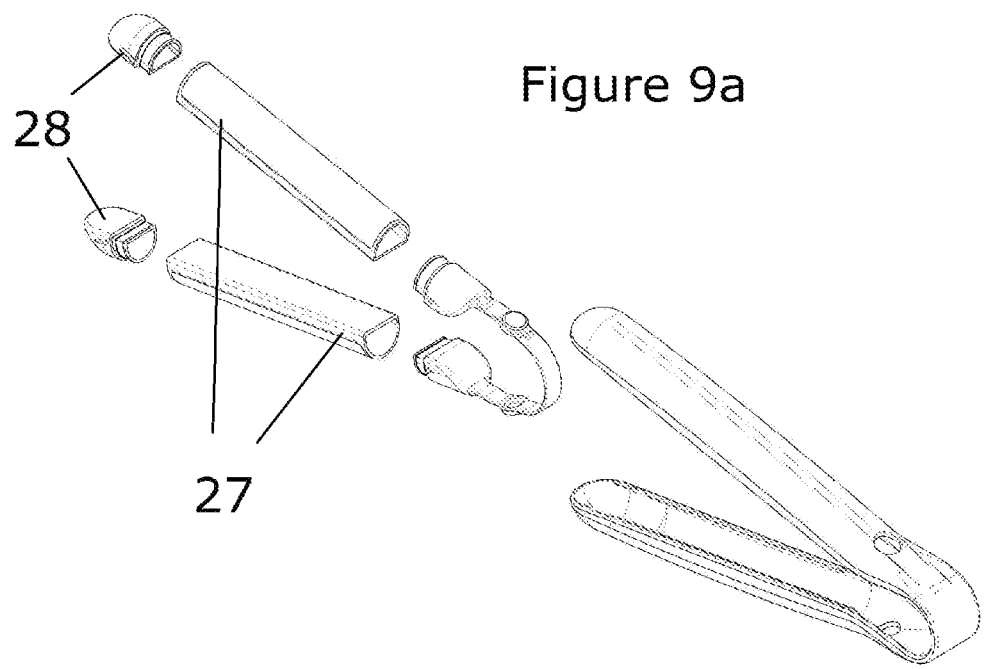
FIGS. 9a, 9b and 9c show exploded perspective, end and side cross section views of yet another embodiment of the invention used to implement a set of handheld hair treatment apparatus.
Figure 9B:
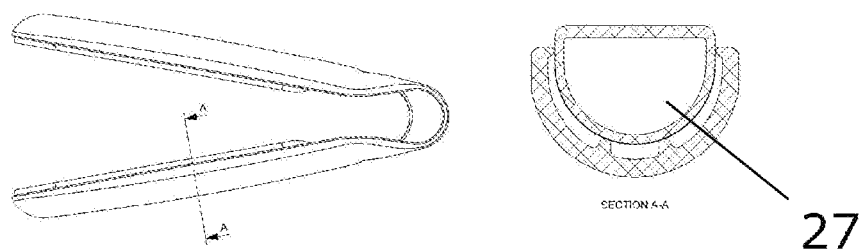
Figure 9C:
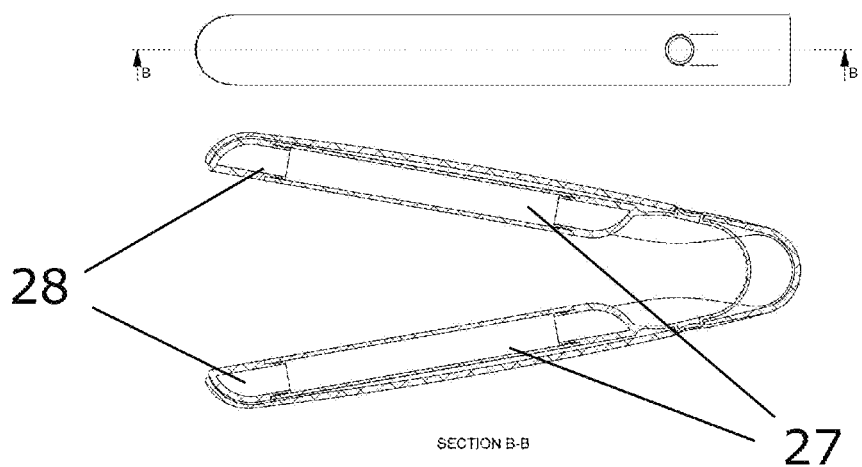

FIGS. 9*a*, 9*b* and 9*c* show exploded perspective, end and side cross section views of yet embodiment of the invention used to implement a set of handheld hair treatment apparatus.

In this embodiment each of the contact housings are formed from an extruded hollow aluminium body 27 which is closed at each end by a hollow thermoplastic end cap 28. These metal contact housings fully enclosing each thermal core in a material with a high degree of thermal conductivity.

In the preceding description and the following claims the word "comprise" or equivalent variations thereof is used in an inclusive sense to specify the presence of the stated feature or features. This term does not preclude the presence or addition of further features in various embodiments.

It is to be understood that the present invention is not limited to the embodiments described herein and further and additional embodiments within the spirit and scope of the invention will be apparent to the skilled reader from the examples illustrated with reference to the drawings. In particular, the invention may reside in any combination of features described herein, or may reside in alternative embodiments or combinations of these features with known equivalents to given features. Modifications and variations of the example embodiments of the invention discussed above will be apparent to those skilled in the art and may be made without departure of the scope of the invention as defined in the appended claims.

What we claim is:

1. A hair treatment apparatus adapted to reduce the temperature of hair, the apparatus including:
   at least one fluid thermal energy storage core formed from a liquid or gel material that only experiences a solidification or condensation phase change when cooled below 0° C. and being arranged to draw heat out of hair;
   at least one contact housing comprising a contact surface arranged to contact hair during a treatment process and a sealed compartment confining the at least one fluid thermal energy storage core; and
   a handle removably connected to the at least one contact housing,
   wherein, prior to use, the at least one contact housing, together with the at least one fluid thermal energy storage core, is cooled to below 0° C., and
   wherein said at least one fluid thermal energy storage core is arranged to cool hair to a temperature below 0° Celsius.

2. A hair treatment apparatus as claimed in claim 1 which includes a water based thermal energy storage core with 3.5-15% mass of ionic additives.

3. A hair treatment apparatus as claimed in claim 1 which includes a fluid thermal energy storage core which experiences a latent heat of fusion effect between 0° and −10° C.

4. A hair treatment apparatus as claimed in claim 1 which includes a fluid thermal energy storage core which experiences a latent heat of fusion effect between −3° and −8° C.

5. A hair treatment apparatus as claimed in claim 1 wherein a contact surface is formed from a waterproof and thermally conductive material.

6. A hair treatment apparatus as claimed in claim 1 wherein a contact housing is configured to project out and away from the handle.

7. A hair treatment apparatus as claimed in claim 1 which includes a plurality of removable thermal energy storage core cartridges.

8. A hair treatment apparatus as claimed in claim 1 wherein the area of contact between a contact housing and handle is minimised by at least one thermal break.

9. A hair treatment apparatus as claimed in claim 1 wherein the contact housing include at least one thermal transfer element provided by a metal shaft which projects from a contact surface into the interior of the volume occupied by the thermal storage core.

10. A hair treatment apparatus as claimed in claim 1 which includes at least one surface projection adapted to promote the formation of variations in the alignment of hair placed in contact with the contact housing.

11. A hair treatment apparatus as claimed in claim 1 wherein a thermal energy storage core is formed from saline solution.

12. A hair treatment apparatus as claimed in claim 1 wherein a thermal energy storage core material is formed from any one or combination of gels, propylene glycol, hydroxethyl cellulose, vinyl coated silica gel, alcohols, liquid ammonia, or compounds formulated to undergo endothermic reactions between −20 and 0°.

13. A hair treatment apparatus as claimed in claim 1 wherein a handle includes a temperature sensor located in close proximity to the contact housing and an associated user indicator configured to alert a user if the temperature sensed exceeds a maximum operating temperature.

14. A hair treatment apparatus as claimed in claim 1 which includes a base station arranged to receive at least a part of a contact housing and to cool the thermal storage core retained within the contact housing.

15. A hair treatment apparatus as claimed in claim 1 which includes a treatment fluid application element.

16. A hair treatment apparatus as claimed in claim 1 wherein a condensation promotion element is provided in association with a contact surface to encourage moisture to condense on or near the contact surface.

17. A hair treatment method comprising the steps of:
providing a hair treatment apparatus including:
a fluid thermal energy storage core formed from a liquid or gel material that only experiences a solidification or condensation phase change when cooled below 0° C., the fluid thermal energy storage core being confined in a sealed compartment of a contact housing connected to a handle, the contact housing comprising a contact surface arranged to contact hair during a treatment process, the handle being removably connected to the contact housing;
prior to use, cooling the contact housing, together with the fluid thermal energy storage core to below 0° C.; and
exposing hair to be treated to the contact housing confining the thermal energy storage core to extract heat from the hair and reduce a temperature of the hair to below 0° C.

18. The method of claim 17, wherein the fluid thermal energy storage core is a water based fluid thermal energy storage core with 3.5-15% mass of ionic additives.

19. The method of claim 17, wherein the fluid thermal energy storage core experiences a latent heat of fusion effect between 0° and −10° C.

20. The method of claim 17, wherein the fluid thermal energy storage core experiences a latent heat of fusion effect between −3° and −8° C.

* * * * *